United States Patent [19]
Zhong et al.

[11] Patent Number: 5,663,258
[45] Date of Patent: Sep. 2, 1997

[54] STRONGLY SWELLABLE, MODERATELY CROSSLINKED COPOLYMERS OF VINYLPYRROLIDONE AND VINYL ACETATE

[75] Inventors: Yuanzhen Zhong, Wayne; Philip F. Wolf, Bridgewater, both of N.J.

[73] Assignee: ISP Investments Inc., Wilmington, Del.

[21] Appl. No.: 603,668

[22] Filed: Feb. 20, 1996

[51] Int. Cl.$^6$ .......................... C08F 226/10; C08F 218/08
[52] U.S. Cl. ............................................ 526/264; 526/319
[58] Field of Search ...................................... 526/264, 319

[56] References Cited

U.S. PATENT DOCUMENTS 5,073,614  12/1991  Shih et al. ................................ 526/258
5,426,163  6/1995  Buehler et al. ........................ 526/207

*Primary Examiner*—Joseph L. Schofer
*Assistant Examiner*—Wu C. Cheng
*Attorney, Agent, or Firm*—Walter Katz; Marilyn J. Maue; Joshua J. Ward

[57]  ABSTRACT

Strongly swellable, moderately crosslinked poly(vinyl pyrrolidone/vinyl acetate) copolymer (XL-PVP/VA) in the form of fine, white powders characterized by (a) an aqueous gel volume of about 15 to 150 ml/g of polymer, (b) a Brookfield viscosity in 5% aqueous solution of at least about 10,000 cps, and (c) being prepared directly by precipitation polymerization of VP and VA monomers in the presence of a crosslinking agent in the amount of about 0.1 to about 2% by weight of VP and VA.

26 Claims, No Drawings

5,663,258

STRONGLY SWELLABLE, MODERATELY CROSSLINKED COPOLYMERS OF VINYLPYRROLIDONE AND VINYL ACETATE

BACKGROUND OF THE INVENTION

1. Field of the Invention

This invention relates to crosslinked copolymers of vinylpyrrolidone (VP) and vinyl acetate (VA), referred to herein as "XL-PVP/VA", and more particularly, to strongly swellable, moderately crosslinked PVP/VA copolymers which are prepared directly as fine, white powders by precipitation polymerization of vinylpyrrolidone and vinyl acetate in an organic solvent.

2. Description of the Prior Art

Strongly swellable, moderately crosslinked polyvinylpyrrolidone (XL-PVP) was made by Shih, J., et al. in U.S. Pat. No. 5,073,614 by precipitation homopolymerization of VP in an organic solvent such as cyclohexane or heptane. However, it is desired to provide new and improved crosslinked polymers which are less hygroscopic and which exhibit enhanced mechanical properties, as compared to XL-PVP itself.

Accordingly, it is an object of this invention to provide a suitable process for making strongly swellable, moderately crosslinked copolymers of vinylpyrrolidone and vinyl acetate which are substantially non-hygroscopic and which have advantageous mechanical properties.

These and other objects of the invention will be made apparent from the following description of the invention.

SUMMARY OF THE INVENTION

What is provided herein is a process for making strongly swellable, moderately crosslinked copolymers of VP and VA, in a defined weight ratio, preferably about 90/10 to about 60/40, in the form of fine, white powders having (a) an aqueous gel volume of about 15 to 150 ml/g of copolymer, preferably about 50 ml/g, (b) a Brookfield viscosity in 5% aqueous solution of at least about 10,000 cps, preferably about 20,000 to about 50,000 cps, and (c) being prepared by precipitation polymerization of VP and VA monomers in an organic solvent, preferably heptane, hexane or cyclohexane, with a free radical polymerization initiator, suitably about 0.2–5%, in the presence of a crosslinker, in an amount of about 0.1 to about 2% by weight of the monomers, while maintaining the overall monomer concentration at less than about 15% by weight, and feeding the monomers at a feeding rate of less than about 0.2 ml/min for 0.5 l of solvent, preferably 0.1–0.15 ml/min, and while agitating the reaction mixture at greater than about 300 rpm, preferably 400–500 rpm.

In the preferred embodiment of the invention, (a) is 25 to 75 ml/g of copolymer, (b) is at least 15,000 cps, and (c) provides a terpolymer having a $T_g$ of at least 150° C., preferably 150° to about 180° C. The initiator level preferably is about 0.25 to 0.8%. In an optimum form of the invention, (a) is 30 to 60 ml/g, (b) is about 20,000 to 50,000 cps, and (c) $T_g$ is 150° C. to 160° C., and the initiator level is about 0.35 to 0.6%.

Gel volume is a measure of the swelling property of the crosslinked polymer and is defined as the equilibrium aqueous swelling volume of polymer per unit weight, and is expressed in the units of ml/g. Gel volume is determined by first adding 1 g. of the polymer to a suitable graduated cylinder filled with water. This mixture then is shaken and allowed to stand at room temperature for 3 days. The volume of the gel which is produced in water is measured and taken as the gel volume. Similarly, the gel volume concept can be applied to non-aqueous systems.

The fine, white powder polymers of the invention are prepared directly by a precipitation polymerization process in an organic solvent, such as an aliphatic hydrocarbon solvent, preferably cyclohexane or heptane, or an aromatic hydrocarbon, such as toluene, in the presence of about 0.1 to 2% by weight of monomers of a crosslinking agent, suitably N,N'-divinylimidazolidone, 1-vinyl-3(E)-ethylidene pyrrolidone, triallyl-1,3,5-triazine-2,4,6(1H,3H,5H)-trione, 2,4,6-triallyloxy-1,3,5-triazine, and pentaerythritol triallyl ether, at about 5 to 25% solids.

DETAILED DESCRIPTION OF THE INVENTION

In accordance with the invention, strongly swellable, moderately crosslinked PVP/VA copolymers are prepared directly in the form of fine, white powders by precipitation polymerization of vinyl pyrrolidone and vinyl acetate in the presence of a predetermined amount of a crosslinking agent and a free radical polymerization initiator in an organic solvent, preferably an aliphatic hydrocarbon, e.g. a $C_3$–$C_{10}$ saturated, branched or unbranched, cyclic or acyclic aliphatic hydrocarbon, and most preferably cyclohexane or heptane, or mixtures thereof.

The amount of solvent used in the process of the invention should be sufficient to dissolve an appreciable amount of the reactants and to maintain the copolymer precipitate in a stirrable state at the end of the polymerization. Generally, about 5 to 25% solids, preferably 10–20%, is maintained in the reaction mixture.

The precipitation polymerization process of the invention is carried out in the presence of a suitable free radical polymerization initiator. Suitable initiators include acyl peroxides such as diacetyl peroxide, dibenzoyl peroxide and dilauryl peroxide; peresters such as t-butylperoxy pivalate, tert-butyl peroxy-2-ethylhexanoate; peroxides such as di-tert-butyl peroxide; percarbonates such as dicyclohexyl peroxydicarbonate; and azo compounds such as 2,2'-azobis (isobutyronitrile), 2,2'-azobis(2,4-dimethylvaleronitrile), 1,1'-azobis(cyanocyclohexane), and 2,2'-azobis (methylbutyronitrile). Other initiators known in the art also may be used. A preferred initiator is the following:

| Preferred Initiator | | |
| --- | --- | --- |
| t-Butyl peroxy-pivalate | Atochem N.A. Liquid; (Lupersol 11) | 75% active in mineral spirits |

The amount of such initiator may vary widely; generally about 0.2–5.0% is used, based on the weight of total monomers charged.

The reaction temperature may vary widely; generally the reaction mixture is maintained at about 40°–150° C., preferably 60°–70° C., during the polymerization. Pressure usually is kept at atmospheric pressure, although higher and lower pressures may be used as well.

In order to make a highly purified crosslinked copolymer, the introduction of another initiator at a higher operational temperature is desirable since it effectively reduces the amount of residual VP and VA monomer content to below 100 ppm in the product. The hihger temperature initiator can be added to the system separately or in admixture with the low temperature initiator. The preferred higher temperature initiator is 2,5-dimethyl-2,5-di(tert-butylperoxy) hexane (Lupersol® 101). The amount of such initiator may be about 0.2–5.0%, based on the weight of total monomers charged. The higher temperature reaction is usually at between about 110° C. and 150° C., preferably at between 120° C. and about 135° C.

The reaction mixture should be stirred vigorously under an inert atmosphere, e.g. nitrogen, during the polymerization. A stirring rate of about 300–600 rpm in 1-liter lab reactor is sufficient to effect the desired polymerization and to keep the precipitate in a stirrable state during the polymerization.

Suitable crosslinking agents for use in the invention include such multifunctional compounds as the divinyl ethers of an aliphatic diol, e.g. the divinyl ethers of 1,3-propanediol, 1,4-butanediol, 1,5-pentanediol, 1,6-hexanediol, 1,7-heptanediol, 1,8-octanediol, 1,9-nonanediol, 1,10-decanediol, 1,11-unidecanediol, and 1,12-dodecanediol; as well as the divinyl ethers of diethylene glycol, triethylene glycol, tetraethylene glycol, pentaethylene glycol, hexaethylene glycol, heptaethylene glycol, octaethylene glycol, nonaethylene glycol, decaethylene glycol and further polyalkylene glycols up to a molecular weight of about 6000. Other suitable crosslinking agents include 1,7-octadiene, 1,9-decadiene, 1,13-tetradecadiene, divinylbenzene, N-N'-divinylimidazolidone, 1-vinyl-3(E)-ethylidene pyrrolidone and methylene bisacrylamide; acrylates such as polyethylene glycol diacrylate, trimethylolpropane triacrylate, propylene glycol diacrylate; allyl ether derivatives of polyhydric alcohols such as pentaerythritol triallyl ether; or polyhydric alcohols esterified once or twice with acrylic acid; triallylamine, tetraallylethylenediamine, diallyl phthalate, and the like. Preferred crosslinking agents are the following: N,N'-divinylimidazolidone, pentaerythritol triallyl ether, 1-vinyl-3(E)-ethylidene pyrrolidone, triallyl-1,3,5-triazine-2,4,6(1H,3H,5H)-trione, and 2,4,6-triallyloxy-1,3,5-triazine.

The precipitation polymerization process of the invention may be carried out by first precharging a suitable reactor with a predetermined amount of the organic solvent, for example, an aliphatic hydrocarbon solvent, and heating the solvent to a desired reaction temperature while stirring vigorously under an inert gas atmosphere. The initiator is then charged into the reactor.

Then the vinylpyrrolidone and vinyl acetate monomers, and the crosslinker material are admitted into the reactor continuously through syringe pumps. The amounts and ratios of monomers and crosslinker can be adjusted based on a predetermined vinylpyrrolidone and vinyl acetate ratio in the copolymer and the extent of crosslinking desired in the final product. Since vinylpyrrolidone is much more reactive than vinyl acetate during the copolymerization, and it is desired to provide substantially uniform copolymer relative to the distribution of monomer units on the macromolecular backbone, the vinyl acetate addition time is made shorter, usually 3–5 hours, and the vinylpyrrolidone and crosslinker material addition time is made longer, usually 5–7 hours. Preferably, the reactants are admitted into the reactor below the surface of the solvent. The reaction mixture is held for an additional period of time, usually 6–8 hours, at a higher temperature, with the addition of a high temperature initiator, e.g. 2,5-dimethyl-2,5-di(tert-butylperoxy) hexane (Lupersol® 101), to complete the polymerization.

Finally, the mixture is cooled to room temperature. Filtering, washing with solvent, and drying provides the desired polymer in yields approaching quantitative. Alternatively, the reaction product may be dried directly to provide the polymer powders.

The polymerization process of the invention in cyclohexane or heptane solvent provides the desired PVP/VA polymer product as a fine, white powder, which precipitates readily, in quantitative yield, with substantially the same degree of crosslinking as the charge of VP and VA monomers and crosslinking agent, in a smooth polymerization without excessive swelling of polymer during the course of the process. More particularly, the solvents of the invention are non-solvents for PVP and VA monomers, which enable the polymerization to proceed in the presence of the crosslinking agent without excessive build-up of viscosity of the reaction mixture during polymerization.

In order to provide for easy removability from the reactor, the PVP/VA copolymer product of the invention preferably should not swell in the hydrocarbon solvent during preparation. To determine the maximum allowable monomer concentration in the solvent without causing the polymer to swell, a series of solubility tests were carried out as follows. PVP/VA copolymer powders were added to heptane in the presence of a certain amount of VP and VA. The results are shown below:

Solubility Test of PVP/VA in Heptane in the presence of VP and VA

Sample: Non-XL PVP/VA (VP/VA=60/40 by weight).

1 g. of sample in 10 g heptane was set at room temperature overnight.

| Amt of VP and VA (1:1 by wt) | % VP and VA | Observation |
| --- | --- | --- |
| 0 | 0% | All powders settled down, none swollen. |
| 0.2g | 2% | Some of the powders were swollen. |
| 0.3g | 3% | All of the powders were swollen. |
| 0.4g | 4% | All of the powders were swollen. |
| 0.5g | 5% | All of the powders were swollen. |
| 1.0g | 10% | Some of the polymer dissolved, some swollen. |

The above results indicated that when the VP and VA concentration in the PVP/VA copolymer is 2% or higher, PVP/VA was swollen in heptane. Therefore, during the preparation of crosslinked PVP/VA, the monomer concentration should be maintained at a very low level (preferably below 3%) to keep the product from swelling in the solvent or forming a gum.

Several measures were taken to achieve the desired low monomer level during the polymerization process: (1) maintaining a low overall monomer concentration (no higher than 15% by weight), (2) providing a low monomer feeding rate (no higher than 0.2 ml per minute for 500 g of solvent), and/or (3) very rapid agitation of the reactants (no lower than 300 rpm).

The invention will be illustrated by reference to the following examples, which are given in parts by weight unless otherwise specified.

EXAMPLE 1

A 1-l, 4-necked glass reaction vessel was equipped with two syringe pumps, controlled by computer, for continuous addition of monomers (VP and VA), and crosslinker, a constant speed mechanical stirrer set at 300 rpm, an adaptor for admitting nitrogen, and a thermocouple connected to a temperature controller. The vessel was charged with 500 g of heptane. Nitrogen was started to purge through the reactor. The temperature was raised to 65° C. and held for 30 minutes. Then 220 microliter (190 micrograms) of t-butylperoxy pivalate (Lupersol 11) was added through the syringe. Thereafter Feeds 1 and 2 were introduced through the syringe pumps simultaneously. Feed 1 was a mixture of 67.5 g of vinylpyrrolidone and 0.34 g (0.45% of VP and VA comonomers by weight) of triallyl-1,3,5-triazine-2,4,6(1H, 3H,5H)-trione (TATT), and it was introduced into the reactor over a period of 6 hours. Feed 2 contained 7.50 g of vinyl acetate and it was added over 4 hours. Then the reaction mixture was held at 65° C. for another hour.

Thereafter the mixture was cooled and transferred to a 1-l, high pressure Buchi reactor and 0.375 g of 2,5-dimethyl-2, 6-di-(t-butylperoxy) hexane (Lupersol 101) was added through a syringe pump. Then the reactor was sealed, heated to 130° C. and held for 7 hours.

The mixture was cooled to room temperature, discharged and dried in a vacuum oven at 70° C. for 1 day and 100° C. for a second day. A blender was used to break the product into fine powders.

A quantitative yield of crosslinked PVP/VA copolymer having a VP to VA ratio (w/w) of 90/10 and containing about 0.45% of the crosslinking agent was obtained.

EXAMPLES 2–5

The procedure of Example 1 was followed in Examples 2–5 using various amounts of VP and VA and different crosslinkers.

A summary of the reaction mixtures used in Examples 1–5 is given in Table 1 below.

TABLE I

| Ex. No. | VP (g) | VA (g) | VP/VA (w/w) | Crosslinker (g) | |
|---------|--------|--------|-------------|------|------|
| 1 | 67.5 | 7.5 | 90/10 | TATT | 0.34 |
| 2 | 67.5 | 7.5 | 90/10 | PTE | 0.34 |
| 3 | 60 | 15 | 80/20 | PTE | 0.34 |
| 4 | 52.5 | 22.5 | 70/30 | PTE | 0.34 |
| 5 | 45 | 30 | 60/40 | PTE | 0.34 |

PTE = Pentaerythritol-triallylether

Properties of Copolymer of Invention

The strongly swellable, moderately crosslinked PVP/VA copolymer powders of the invention are characterized by its unique gel volume and viscosity, which properties enable the polymer to thicken aqueous and non-aqueous solutions effectively.

The viscosity of the polymer is defined by its Brookfield viscosity in cps, which is determined upon a 5% aqueous solution of the polymer at 25° C. by a standard analytical procedure using Model LTV and Spindle No. 4.

For maximum utility, it is desirable that the hydrated polymer exhibit a high gel volume and a high viscosity. With increasing crosslinking density in the polymer, the gel volume decreases and viscosity increases and then decreases, passing through a maximum. In the crosslinked polymer system of this invention, an effective thickener product is provided by including crosslinker in the reaction mixture at a suitable concentration of about 0.2 to 1.0% by weight, based upon VP and VA monomers, preferably about 0.25 to 0.8%, and optimally, at about 0.35 to 0.6%. At this suitable amount of crosslinker loading, the crosslinked polymer product exhibits a gel volume of about 15 to 150 ml/g of polymer and a Brookfield viscosity of at least 10,000 cps. At the preferred crosslinker concentration, the gel volume is about 25 to 75 ml/g of polymer and its Brookfield viscosity is at least 15,000 cps. At the optimal amount crosslinker present in the reaction mixture, the polymer exhibits a gel volume of about 30 to 60 ml/g of polymer and a Brookfield viscosity of about 20,000 to 50,000 cps.

Glass Transition Temperature ($T_g$)

The glass transition temperature, Tg, is an indicator of the extent of crosslinking in the copolymer. Above this temperature, the polymer is in viscous or rubbery state; below this temperature, it is in a hard or glassy state. $T_g$ is related to the amount of free ends in the polymer. If a polymer is completely crosslinked, it will be decomposed at an elevated temperature and no $T_g$ exists. If a polymer is moderately crosslinked, the $T_g$ can be determined and it should be higher than a non-crosslinked polymer with the same VP and VA composition. The XL-PVP/VA products of Examples 1–5 gave $T_g$'s higher than corresponding non-XL PVP/VA which indicates a moderate crosslinking state in these copolymers. At an optimal amount of crosslinker in the reaction mixture, the $T_g$ of the crosslinked copolymer obtained is at least 150° C., preferably in the range of 150° C. to 180° C., and optimally, at about 150° C. to about 170° C.

The properties of the crosslinked PVP/VA copolymers herein with different VP to VA ratios, (Examples 1 to 5) including swell volume, Brookfield viscosity and glass transition temperature, are given in Table 2 below, in favorable comparison to non-crosslinked copolymers of the same composition.

TABLE 2

| Ex. No. | VP/VA | Swell Volume, ml | Brookfield Viscosity, cps | $T_g$, °C. XL Copolymer | $T_g$, °C. non-XL Copolymer |
|---------|-------|------------------|---------------------------|---------------------|----------------------|
| 1 | 90/10 | 52 | 62,800 cps | 159 | 137 |
| 2 | 90/10 | 53 | 11,000 cps | 159 | 137 |
| 3 | 80/20 | 50 | 48,200 cps | 151 | 122 |
| 4 | 70/30 | 42 | 12,100 cps | 169 | 110 |
| 5 | 60/40 | 85 | 150,000 cps | 154 | 100 |

As an added feature of the invention, the residual VP and VA monomer content of the polymers obtained herein is less than about 0.1% by weight. In aqueous based processes, in contrast, the formation of a gel mass during polymerization may trap considerable amounts of VP and VA monomer in the polymeric gel network.

The strongly swellable, moderately crosslinked PVP/VA copolymers of the invention are useful in pharmaceutical applications, such as in controlled release tablets, binders, coatings, nasal spray delivery systems, and tablet disintegrating agents; in personal care compositions, as for example, in hair conditioners and as a gelling agent in a gelled acidizer compositions. In these and other formulations and compositions, the substantially non-hygroscopic and predetermined hydrophilic/hydrophobic properties of the copolymer are useful in providing an improved swelling and thickening agent therein.

The copolymers of the invention also find use as a disposable and extended wear soft and hard contact lenses by providing a material which has a high water content, excellent tensile strength, tear resistance and low affinity for lachrymal proteins and other contaminants. Other monomers such as methyl methacrylate and hydroxyethyl methacrylate may be included therein.

While the invention has been described with particular reference to certain embodiments thereof, it will be understood that changes and modifications may be made which are within the skill of the art. Accordingly, it is intended to be bound only by the following claims, in which:

What is claimed is:

1. Strongly swellable, moderately crosslinked poly(vinyl pyrrolidone/vinyl acetate) copolymer (XL-PVP/VA) in the form of fine, white powders characterized by (a) an aqueous gel volume of about 15 to 150 ml/g of polymer, (b) a Brookfield viscosity in 5% aqueous solution of at least about 10,000 cps, and (c) being prepared directly by precipitation polymerization of VP and VA monomers in the presence of a crosslinking agent in the amount of about 0.1 to about 2% by weight of VP and VA.

2. Strongly swellable, moderately crosslinked PVP/VA copolymer powders according to claim 1 wherein (a) is about 25 to 75 ml/g of polymer, (b) is at least about 15,000 cps, and (c) is about 0.25 to 0.8%.

3. Strongly swellable, moderately crosslinked PVP/VA copolymer powders according to claim 1 wherein (a) is about 30 to 60 ml/g of polymer; (b) is about 20,000 to 50,000 cps; and (c) is about 0.35 to 0.6%.

4. XL-PVP/VA copolymer powders according to claim 1 wherein said precipitation polymerization is carried out in an organic solvent.

5. XL-PVP/VA copolymer powders according to claim 4 in which the organic solvent is cyclohexane or heptane.

6. XL-PVP/VA copolymer powders according to claim 1 having less than about 0.2% by weight residual VP and VA monomers therein.

7. XL-PVP/VA copolymer powders according to claim 1 in which said crosslinking agent is selected from N,N'-divinylimidazolidone, 1-vinyl-3(E)-ethylidene pyrrolidone, pentaerythritol triallyl ether, triallyl-1,3,5-triazine-2,4,6(1H,3H,5H)-trione and 2,4,6-triallyloxy-1,3,5-triazine.

8. XL-PVP/VA copolymers according to claim 1 wherein the VP/VA weight ratio is about 90/10 to about 60/40.

9. XL-PVP/VA copolymers according to claim 1 wherein the glass transition temperature, $T_g$, is at least about 150° C.

10. A process of making strongly swellable, moderately crosslinked PVP/VA copolymers directly as fine, white powders which comprises precipitation polymerizing VP and VA monomers in the presence of a crosslinking agent and a free radical polymerization initiator in an organic solvent at a polymerization temperature of about 40° to 150° C. while maintaining the overall monomer concentration of less than about 15% by weight of the solvent.

11. A process according to claim 10 in which said organic solvent is an aliphatic hydrocarbon which is a $C_3$–$C_{10}$ saturated hydrocarbon, branched or unbranched, cyclic or acyclic, or mixtures thereof.

12. A process according to claim 11 in which said solvent is cyclohexane or heptane.

13. A process according to claim 10 wherein the crosslinking agent is present in an amount of about 0.1 to 2% by weight of the monomers.

14. A process according to claim 13 wherein said amount is about 0.25 to about 0.8%.

15. A process according to claim 13 wherein said amount is about 0.35 to 0.6%.

16. A process according to claim 10 which is run at about 5–25% solids.

17. A process according to claim 16 which is run at about 10–20% solids.

18. A process according to claim 10 in which a reactor is charged with the organic solvent, initiator is added, and a solution of VP and VA and crosslinker is introduced therein continuously.

19. A process according to claim 18 wherein said solution is introduced below the surface of the solvent.

20. A process according to claim 10 wherein said polymerization temperature is about 50°–150° C.

21. A process according to claim 10 in which said yield of polymer powders is substantially quantitative.

22. A process according to claim 10 wherein the polymer has the characteristics given in claim 9.

23. A process according to claim 10 in which the polymer powders are recovered by filtering and drying, or directly by vacuum drying.

24. A process according to claim 10 wherein the monomer feeding rate is 0.2 ml per minute or less for a 500 ml solvent charge, and the agitation rate is at least 300 rpm.

25. A process according to claim 10 wherein the initiator level is 0.2–5%.

26. A process according to claim 10 in which the VP and crosslinker addition time is longer than the VA addition time.

* * * * *